(12) United States Patent
Mortimer et al.

(10) Patent No.: US 8,747,720 B2
(45) Date of Patent: Jun. 10, 2014

(54) PROCESS FOR PROLONGING THE PROCESSING WINDOW OF THERMOSETTING RESINS

(75) Inventors: Stephen Mortimer, St. Ives (GB); Neal Patel, Ely (GB); Estaban Vilalon, Lyons (FR)

(73) Assignees: Hexcel Composites, S.A.S., Dagneux (FR); Hexcel Composites, Ltd., Duxford (GB)

( * ) Notice: Subject to any disclaimer, the term of this patent is extended or adjusted under 35 U.S.C. 154(b) by 150 days.

(21) Appl. No.: 13/390,155

(22) PCT Filed: Sep. 14, 2009

(86) PCT No.: PCT/IB2009/006839
§ 371 (c)(1),
(2), (4) Date: Feb. 13, 2012

(87) PCT Pub. No.: WO2011/030175
PCT Pub. Date: Mar. 17, 2011

(65) Prior Publication Data
US 2012/0146256 A1    Jun. 14, 2012

(51) Int. Cl.
*B29C 45/14* (2006.01)

(52) U.S. Cl.
USPC .................. 264/279; 264/279.1; 264/257

(58) Field of Classification Search
CPC ............................... B29C 70/02; B29C 70/06
USPC ....................... 264/257, 279, 279.1
See application file for complete search history.

(56) References Cited

U.S. PATENT DOCUMENTS

| 2,959,511 | A | * | 11/1960 | Finger | 156/183 |
| 3,975,479 | A | * | 8/1976 | McClean | 264/102 |
| 5,098,496 | A | * | 3/1992 | Breitigam et al. | 156/180 |
| 6,083,855 | A | | 7/2000 | Olson et al. | |
| 6,638,466 | B1 | | 10/2003 | Abbott | |
| 2004/0242836 | A1 | * | 12/2004 | Hayes et al. | 528/124 |
| 2005/0009943 | A1 | | 1/2005 | MacQueen et al. | |
| 2009/0202809 | A1 | * | 8/2009 | Cawse | 428/295.1 |

OTHER PUBLICATIONS

Stickler, et al., "Transverse Stitched T-Joints in Bending with PR520 Resin: Initial Results", Journal of Reinforced Plastics and Composites, pp. 65-75, vol. 20, No. 01/2001 (2001).

* cited by examiner

*Primary Examiner* — Joseph S Del Sole
*Assistant Examiner* — David N Brown, II
(74) *Attorney, Agent, or Firm* — W. Mark Bielawski; David J. Oldenkamp

(57) ABSTRACT

The processing window for thermosetting resins that contain particulate hardeners is prolonged using the combined steps of heat-treating the resin to form a low-viscosity resin mixture in which the particles are dissolved and then molding the low-viscosity resin mixture at temperatures below the dissolution temperature of the particles to infuse a fibrous preform. The infused resin preform is heated to the curing temperature of the resin to provide final curing of the resin.

20 Claims, 2 Drawing Sheets

PROCESS FOR PROLONGING THE PROCESSING WINDOW OF THERMOSETTING RESINS

BACKGROUND OF THE INVENTION

1. Field of the Invention

The present invention relates generally to liquid composite moulding (LCM) processes in which a thermosetting resin is injected into a mold that contains a fibrous body. The resin infuses throughout the fibrous body and is cured within the mold to form a final composite structure. More particularly, the present invention is directed to prolonging the processing window of LCM resins so that the resins can be infused into larger and more complex structures.

2. Description of Related Art

Composite materials are used in a wide variety of endeavors where a structure must have a high strength to weight ratio. The two basic components of composite materials are a resin matrix and a fibrous support structure that reinforces the resin. There are a wide variety of processes for combining resins and fibrous supports together to form structures that can be cured to form final composite structures. The particular process that is used depends on many factors including resin and fiber types, size of the structure, complexity, cost, weight/strength requirements and quality control issues.

For example, in many instances an adequate process for making composite structures is simply to manually impregnate the resin into the fibrous support using a brush or roller. In other situations, the resin is impregnated into the fibrous support using specialized equipment to form a pre-impregnated fibrous support (prepreg). One or more layers of prepreg are then placed on or in a mold to form the desired shape, which is then cured to form the final composite structure.

Liquid composite moulding (LCM) processes are popular processes that have been used widely for making composite structures. Two examples of LCM processes are resin transfer moulding (RTM) and liquid resin infusion (LRI). RTM and LRI are used widely in industries, such as aerospace, where it is necessary to make complex parts or structures that must reliably and reproducibly meet strict limits with respect to strength and weight. RTM processes generally involve injection of the resin into a mould that contains a pre-formed fibrous support. The amount of resin that is injected into the mould and the process conditions within the mould are carefully controlled to insure that the resin is infused completely and uniformly throughout the fibrous support. LRI processes use a mould that has a flexible membrane as the upper tooling surface. The liquid resin is drawn into the mould by applying a vacuum to the mould. The resin passes rapidly over the surface of the fibre preform by means of a layer of highly porous "flow media". The resin is infused through the thickness of the preform and then cured before demoulding of the finished fibre-resin assembly.

The resins that are used in LCM processes are commonly referred to as LCM resins. Bismaleimide resins and epoxy resins are both popular LCM resins. A particular type of epoxy LCM resin that contains a particulate amine hardener is useful in situations where high toughness is desired. This type of LCM resin is available commercially from Hexcel Corporation (Dublin, Calif.) and Cytec Corporation (Anaheim, Calif.) under the trade names ST15 and PR520, respectively. These epoxy LCM resins contain an epoxy resin component and an amine hardener. The amine hardener is present as particles, which are dispersed throughout the epoxy resin component. In practice, it has been found that the hardener particles are larger than the openings in many fibrous supports. As a result, the particles are inherently filtered out of the LCM resin by the fibrous support when the resin is injected into the mould.

An important consideration for any LCM process that uses particulate hardeners is to make sure that the hardener particles are dissolved before they can be filtered out by the fibrous support. The amine hardener particles that are typically used in amine-hardened epoxy LCM resins dissolve in the epoxy resin component at temperatures on the order of 150° C. to 160° C. This particle dissolution temperature is only 30° C. to 40° C. below the moulding or curing temperature that is normally used for these resins. Accordingly, LCM processors continually face the problem of heating the resin enough to insure particle dissolution, while at the same time avoiding premature gelling or curing of the LCM resin.

The conventional procedure for processing epoxy LCM resins that contain amine particle hardeners is to use a combination of pre-injection heating and mould heating to insure that the hardener particles are dissolved before they can be trapped by the fibrous support. Typically, the mould temperature is kept above the dissolution temperature and the resin is pre-heated to the dissolution temperature prior to injection for only the time necessary to insure that the combination of pre-heating and mould temperature results in dissolution of the particles in a timely fashion. The temperature of the mould is raised to the final curing temperature only after the fibrous structure is completely saturated. This procedure has worked well and insures that the amine hardener is uniformly distributed along with the resin.

The viscosity of the LCM resin, when it is injected into the mould, must be sufficiently low to allow the resin to permeate the fibrous support. The viscosity of the resin does increase gradually over time due to chemical reaction until it reaches a point where the resin can no longer flow and further infusion of the fibrous support is halted. The "processing window" is the time it takes for the resin to go from relatively low viscosity material that flows through the fibrous support to a relatively high viscosity material, which does not flow and makes further resin infusion difficult, if not impossible.

The processing window for LCM resins, which include a particulate amine hardener, in the conventional process described above is on the order of 30 to 45 minutes. This length of processing window works well for many situations where the fibrous structure is sufficiently small and the fibrous support is sufficiently porous to allow complete resin infusion before the resin becomes too viscous. However, there are a number of situations where it can take well over 45 minutes to completely infuse the LCM resin into the fibrous preform. This is especially the case for large and/or complex structures. Accordingly, it is desirable to prolong the LCM processing window for LCM resins that contain particulate hardeners, so that a wider range of composite structures can be moulded.

SUMMARY OF THE INVENTION

In accordance with the present invention, it was discovered that that the processing window for liquid composite moulding (LCM) resins that contain particulate hardeners can be prolonged if the resin is subjected to a heat-treatment step prior to being introduced into the mould and the mould is kept at a temperature that is below the dissolution temperature of the particles until the desired degree of resin infusion into the fibrous support is achieved.

The invention is based on the discovery that the LCM processing window for a given LCM resin can be prolonged if the uncured resin is first heated to the dissolution temperature of the particulate hardener for a time that is sufficient to dissolve the particles and form a heat-treated resin mixture. The heat-treated resin mixture is then cooled to form a low-viscosity resin mixture that is suitable for injection into the mould and infusion into the fibrous structure.

As a feature of the invention, the low-viscosity resin mixture in the mould is maintained at a dwell-temperature which is below the dissolution temperature of the particulate hardener. The resin mixture is kept at the dwell-temperature for a sufficient dwell-time to completely infuse resin into the fibrous structure. At the end of the dwell-time, the resin mixture is cured at the curing temperature for the resin. The maximum dwell-time for the low-viscosity resin mixture corresponds to the processing window for the resin.

The present invention is particularly well-suited for use in LCM processes where relatively long resin processing windows are needed in order to insure complete infusion of resin into large and/or complex fibrous supports. It was discovered that the processing window for LCM resins containing particulate hardeners can be more than doubled when the resin is heat-treated and then subjected to a dwell-temperature in the mold in accordance with the present invention. The invention is also well-suited for use in LCM processes where a prolonged processing window is necessary in order to insure complete and uniform infusion of resin throughout the fibrous support structure. A prolonged processing window is advantageous in situations where the porosity of the fibrous support or other design features make it difficult to infuse resin into the part. The extra infusion time provided by the invention insures that fibrous support is completely and uniformly infused with resin.

The above described and many other features and attendant advantages of the present invention will become better understood by reference to the following detailed description when taken in conjunction with the accompanying drawings.

DETAILED DESCRIPTION OF THE INVENTION

The present invention involves modifying existing LCM processes, which utilize resins that include a particulate hardener, in order to prolong the processing window of the LCM resin while it is in the mould. The prolongation of the processing window in the mould advantageously increases the time over which the resin is able to flow within the mould and fibrous support structure located therein. The invention is applicable to any LCM process, including RTM and LRI, wherein the LCM resin is a mixture of a thermosetting resin and a particulate hardener that is dispersed within the thermosetting resin. The present invention is applicable to all types of LCM resins, including bismaleimide LCM resins and epoxy LCM resins that contain particulate hardeners. The invention is preferably used to extend the processing window of epoxy LCM resins that contain a particulate amine hardener. These types of epoxy LCM resins are available commercially under the trade names ST15 and PR520, which are available from Hexcel Corporation (Dublin, Calif.) and Cytec Corporation (Anaheim, Calif.), respectively.

Figure 1:
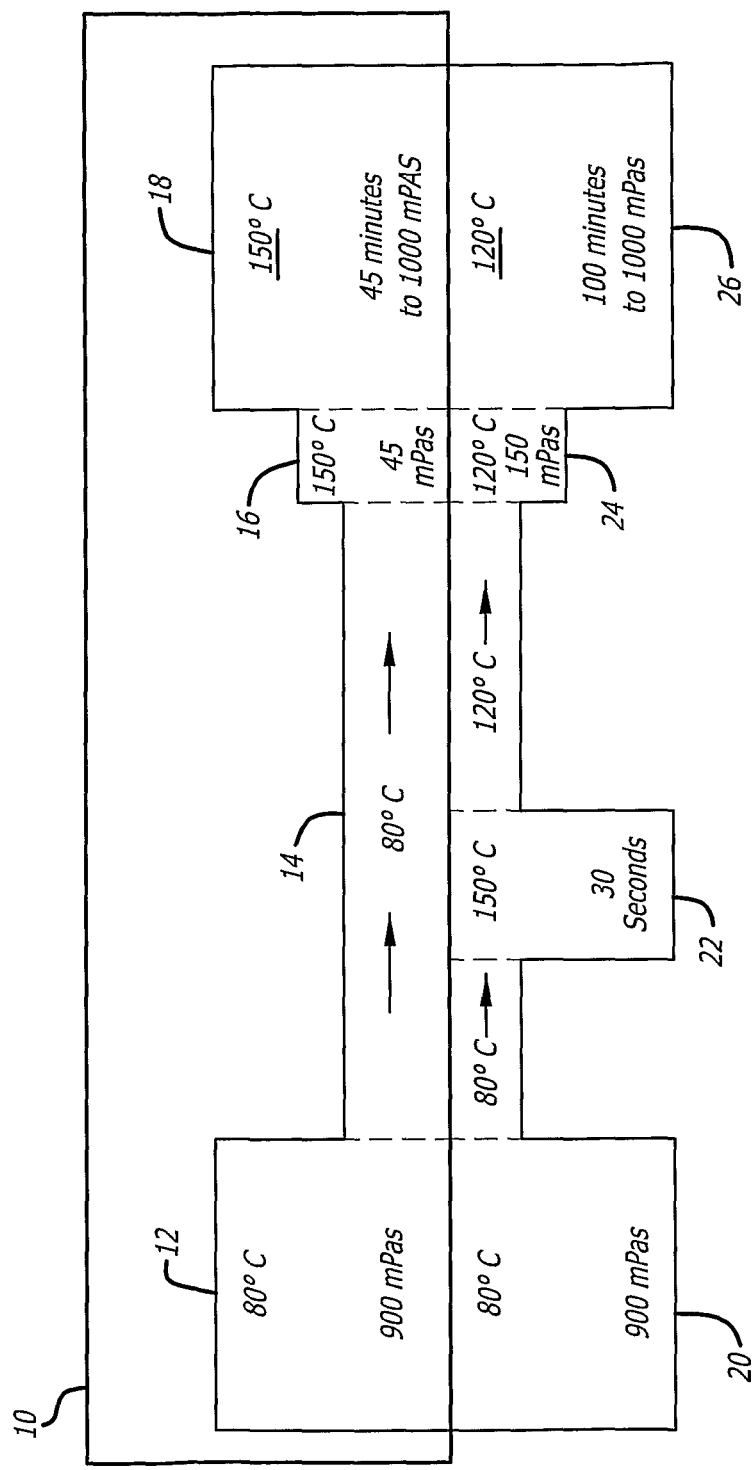
FIG. 1 is a diagrammatic representation showing a conventional LCM process in the top half of the figure that is compared to an exemplary LCM process in accordance with the present invention, which is shown in the bottom half of the figure.

A diagrammatic representation of a preferred exemplary LCM process in accordance with the present invention is shown in the bottom half of FIG. 1. For comparative purposes, a conventional LCM process is shown within Box 10 in the upper half of FIG. 1. An epoxy LCM resin that contains particulate amine hardeners is typically a relatively high viscosity paste at room temperature. As shown at 12 in Box 10, the LCM resin paste is heated to a temperature of around 80° C. to initially reduce the viscosity to between 200 and 1000 mPas. This initial temperature is referred to commonly as the "pot temperature" of the LCM resin and the viscosity of the LCM resin in the "pot" is referred to as the "pot viscosity".

The LCM resin at the pot temperature is transferred as shown at 14 to an injection pre-heater 16 where the LCM resin is heated to a dissolution temperature of around 150° C. to partially dissolve the particulate amine hardener and reduce the viscosity of the LCM resin to around 45 mPas. The LCM resin is then injected into the mould 18 where it is kept at a temperature that is at least above the dissolution temperature to insure that the particles continue to dissolve. A pre-heater is not always required. The pre-heating of the resin can be incorporated into the mould design, so that a separate pre-heater is not required. "Pre-heating" of the resin within the mould is possible, provided that there is enough time for the particles to dissolve within the mould before reaching the fibrous preform.

The temperature of the mould 18 is increased to the cure temperature of between about 180° and 190° C. after the fibrous support located in the mold has been completely infused or "wetted-out" with the LCM resin. The mould is kept at the cure temperature for an hour or more to insure complete curing of the LCM resin.

The processing window for an LCM resin is considered to be the time that it takes the LCM resin, once in the mould, to reach a viscosity of about 1000 mPas. At this viscosity, the LCM resin is too viscous to continue flowing through most fibrous structures to any great degree. For LCM resins, like ST15 and PR520, which are processed as set forth in Box 10, the processing window can be as long as 45 minutes, if the mould is kept close to the dissolution temperature. The processing window is significantly shorter if the mold is heated initially to the cure temperature.

The LCM process in accordance with the present invention follows the same basic procedure as the conventional LCM process shown in Box 10, except for a number of significant differences that unexpectedly prolong the processing window of the LCM resin. Like conventional LCM processes, the present invention initially heats the LCM resin paste to a pot temperature as shown at 20 in order to reduce the viscosity of the resin. The pot temperature may range from about 65° C. to about 95° C. with about 80° C. being the preferred pot temperature. Higher pot temperatures are useful for easier pumping of the resin, since the viscosity of the resin is lower. However, this must be balanced against the reduced thermal stability and/or viscosity advancement that occurs at the higher temperatures. In general, it is preferred that the pot temperature be as high as possible to reduce viscosity of the resin, while not unduly reducing the thermal stability of the resin or unduly advancing viscosity or cure.

The viscosity of the LCM resin in the pot may range from between about 200 mPas and 1000 mPas with viscosities in the lower end of the range being preferred. ST15 and PR520-type resins tend to be quite viscous. Accordingly, it is preferred that the pot temperature for ST15 and PR520-type resins be about 80° C., so as to provide a resin having a viscosity of about 900 mPas.

In contrast to the conventional LCM process, the present invention requires that the LCM resin be subjected to a heat-treatment step where the LCM resin is heated from the pot temperature to the dissolution temperature of the particulate hardener as shown at 22. For epoxy LCM resins that contain a particulate amine hardener, like ST15 and PR520, the dissolution temperature is usually from about 150° C. to about 160° C. The dissolution temperature may be different for other types of particulate hardeners and may range from about 140° C. to about 170° C. The LCM resin is kept at the dissolution temperature only as along as is necessary to dissolve substantially all of the particulate hardener and form a heat-treated resin mixture.

The particulate hardener is considered to be substantially dissolved in the LCM resin when at least 95% of the particles are completely dissolved. Preferably, no more than 2% of the hardener particles will remain in the heat-treated resin mixture. Most preferred are heat-treated resin mixtures in which less than 1% of the hardener particles are not completely dissolved. The time that it takes to form the heat-treated resin mixture will vary depending upon a number of factors including the amount of LCM resin that is being heat-treated, the dissolution temperature, the size of the hardener particles and the type of particles. In general, the LCM resin will be kept at the dissolution temperature for a period ranging from a few seconds up to a few minutes. The time that the LCM resin is kept at the dissolution temperature is preferably only long enough to insure that the hardener particles are substantially dissolved. Dissolution time periods on the order of around 30 seconds are preferred for LCM resins, such as ST15 and PR520. The LCM resin may be heated in batch-type processing or the resin may be heated in continuous-flow type processing.

In accordance with the present invention, the heat-treated resin mixture is cooled to a temperature that is from 10° C. to 50° C. below the dissolution temperature to form a low-viscosity resin mixture that has a viscosity that ranges from about 100 mPas to below 1000 mPas. It is preferred that the viscosity of the low viscosity resin mixture be less than about 900 mPas and more preferably in the range of about 100 mPas to about 600 mPas. For ST15-type LCM resins, it is preferred that the heat-treated resin mixture be cooled to about 30° C. below the dissolution temperature (120° C.) to form a low-viscosity resin mixture having a viscosity of about 150 mPas. The low-viscosity resin mixture is introduced into the resin mould as shown at 24. The low-viscosity resin mixture is not heated prior to injection into the resin transfer mould because the particles of hardener have already been dissolved. For PR520-type LCM resins, it is preferred that the heat-treated resin mixture be cooled to about 40° C. below the dissolution temperature (120° C.) to form a low-viscosity resin mixture having a viscosity of about 600 mPas.

The low-viscosity resin mixture is maintained in the mould 26 at a temperature that is below the dissolution temperature of the particulate hardener. This temperature is referred to herein as the "dwell-temperature". The dwell-temperature should be about 10° C. to 50° C. below the dissolution temperature. Preferably, the dwell-temperature should be as low as possible in order to prolong the processing window. However, this must be balanced against the fact that the viscosity of the resin tends to increase as the temperature is lowered. Complicating matters further is that as the LCM resin cures, the viscosity of the resin increases and this rise in viscosity due to curing of the resin also increases as the temperature is increased. All of these factors affect the length of the processing window and the resins ability to infuse completely into the fibrous support. For ST15 and PR520-type LCM resins, it was found that a dwell-temperature of between about 100° C. and about 130° C. provides a preferred combination of processing window extension and low viscosity levels. Dwell-temperatures of about 120° C. are particularly preferred.

The term "dwell-time", as used herein, is the period of time that the LCM resin is kept at the dwell-temperature in the mould. The dwell-time is the same as the processing window when the mould is kept at the dwell-temperature until the LCM resin reaches a viscosity of 1000 mPas. The LCM resin in the mould may be kept at the dwell-temperature until the resin reaches the 1000 mPas viscosity level. This results in maximum prolongation of the processing window for a given RTM resin. For example, the processing window and available dwell-time for an ST15 or PR520-type RTM resin is prolonged to over 100 minutes when the mould is maintained over the entire period at a dwell-temperature of 120° C. The available dwell-time can be prolonged to over 120 minutes when the mould is maintained over the entire period at a dwell-temperature of 100° C. Available dwell-times of at least 80 minutes are preferred with available dwell-times of at least 100 minutes being particularly preferred.

In practice, it is desirable to prolong the processing window, if necessary, only for a sufficient time to insure that the LCM resin has been completely infused throughout the fibrous structure and that the mould is completely filled with resin. In these situations, one increases the temperature of the LCM resin to the curing temperature prior to the resin reaching the processing window maximum viscosity of 1000 mPas. As a result, the dwell-time can be shorter than the available dwell-time (processing window) due to the early increase in temperature from the dwell-temperature to the curing temperature. It is preferred that the temperature of the LCM resin in the mould be increased above the dwell-temperature once the fibrous structure has been completely infused with LCM resin and the mould completely filled. Complete infusion of the fibrous structure may be determined using sensors placed within the mould. However, complete infusion of the fibrous structure is typically determined by waiting for LCM resin to exit through outlets that are appropriately placed on the mould to insure that the LCM resin has passed through the fibrous structure before it reaches the exits.

Once the fibrous structure has been completely infused and the mould completely filled, the temperature of the LCM resin is increased from the dwell-temperature to the curing temperature. For most LCM resins, the curing temperature for the process of the present invention is between about 170° C. and 210° C. For epoxy LCM resins such as, ST15 and PR520, curing temperatures of between about 180° and 190° C. are preferred. The resin-infused fibrous support is kept in mould 26 at the cure temperature for the same amount of time as in conventional LCM processes.

The particular type of fibrous support material that is infused with LCM resin using the process of the present invention can be any of the usual fibrous support materials that are suitable for LCM processing. Exemplary fibres used to form the fibrous supports include carbon fibres, glass fibres, ceramic fibres, and aramid fibres, such as Kevlar. The fibers may be randomly oriented, woven or unidirectional. The invention is particularly useful for LCM processing of fibrous support materials that require extra time for resin infusion. These types of fibrous support materials include large fibrous structures and structures with complex shapes that may impede uniform resin infusion. In general, those fibrous structures that require over 45 minutes for the resin to completely infuse the structure are preferred. In addition to size and shape, the infusion time is also dependent on the type of fibrous structure. Typically, woven and braided fibrous structures have higher permeability and infuse relatively easily. Unidirectional and non-crimp fabric (NCF) fibrous structures have much lower permeability and infuse more slowly. The prolongation of the processing window provided by the present invention is particularly useful for such low-permeability fibrous structures.

Examples of practice are as follows:

EXAMPLE 1

Figure 2:
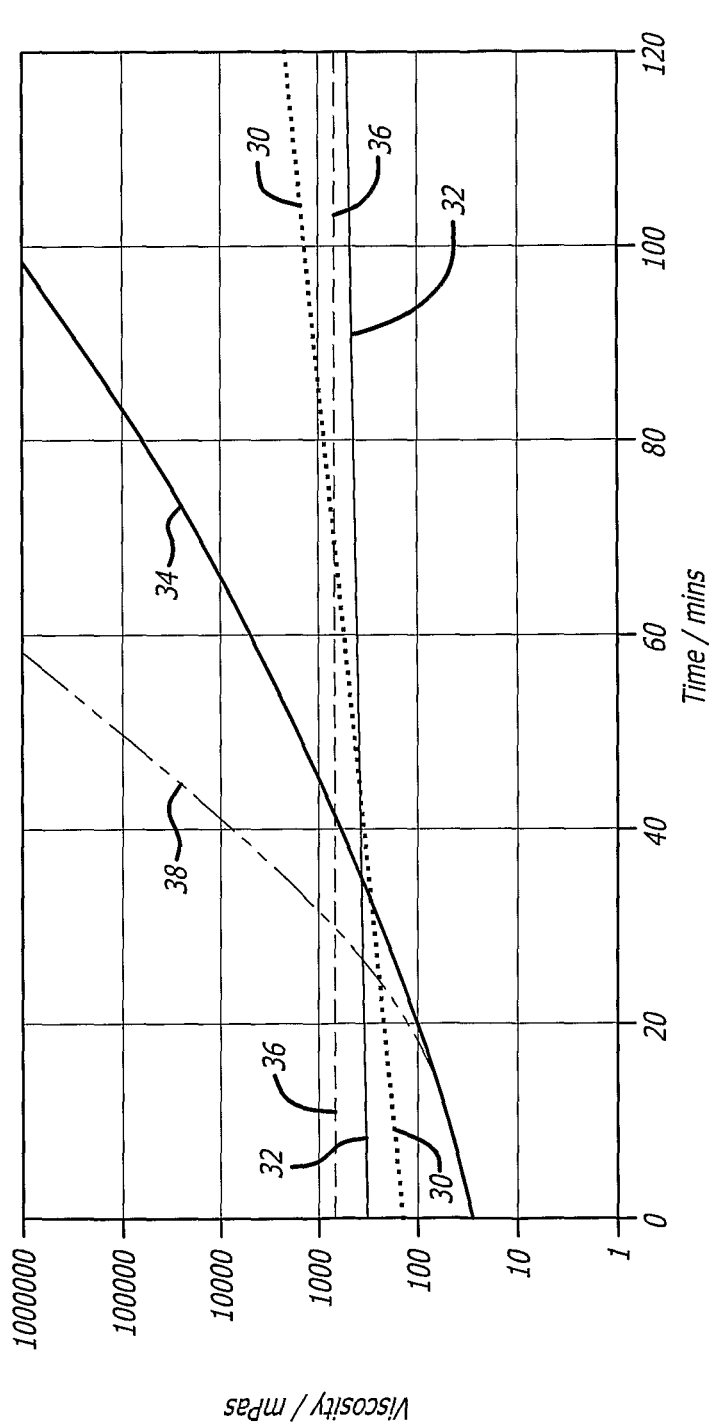
FIG. 2 is a graph showing how the viscosity of two exemplary LCM resins increase rapidly using prior art LCM processing as compared to the viscosity of LCM resin processed in accordance with the present invention.

A 10 g sample of ST15 LCM resin was heated at a dissolution temperature of 150° C. for 30 seconds in order to dissolve all of the particulate amine hardener and form a heat-treated resin mixture. The heat-treated resin mixture was cooled to 120° C. to provide a low-viscosity resin mixture having a viscosity of about 150 mPas. The low-viscosity resin mixture was then subjected to a moulding or dwell-temperature of 120° C. As shown by curve 30 in FIG. 2, the RTM resin did not reach the processing window viscosity limit of 1000 mPas for more than 100 minutes.

EXAMPLE 2

A 10 g sample of ST15 LCM resin was heated at a dissolution temperature of 150° C. for 30 seconds in order to dissolve all of the particulate amine hardener and form a heat-treated resin mixture. The heat-treated resin mixture was cooled to 100° C. to provide a low-viscosity resin mixture having a viscosity of about 350 mPas. The low-viscosity resin mixture was then subjected to a moulding or dwell-temperature of 100° C. As shown by curve 32 in FIG. 2, the LCM resin did not reach the processing window viscosity limit of 1000 mPas for more than 120 minutes.

COMPARATIVE EXAMPLE 1

A 10 g sample of ST15 LCM resin was heated to a temperature of 150° C. and then subjected to a moulding temperature of 150° C. As shown by curve 34, the ST15 LCM resin reached the processing window viscosity limit of 1000 mPas within 45 minutes.

EXAMPLE 3

A 10 g sample of PR520 LCM resin was heated at a dissolution temperature of 160° C. for 30 seconds in order to dissolve all of the particulate amine hardener and form a heat-treated resin mixture. The heat-treated resin mixture was cooled to 120° C. to provide a low-viscosity resin mixture having a viscosity of about 600 mPas. The low-viscosity resin mixture was then subjected to dwell-temperature of 120° C. As shown by curve 36, the low-viscosity resin mixture did not reach the processing window viscosity limit of 1000 mPas for more that 120 minutes.

COMPARATIVE EXAMPLE 2

A 10 g sample of PR520 LCM resin was heated to a temperature of 150° C. and then subjmolding temperature of 150° C. As shown by curve 38, the PR520 LCM resin reached the proceected to a ssing window viscosity limit of 1000 mPas within 35 minutes.

EXAMPLE 4

ST15 epoxy LCM resin, which contains amine hardener particles, is heated to a pot temperature of 80° C. to form an uncured resin mixture having a pot viscosity of 900 mPas. The uncured resin mixture is heated to 150° C. for 30 seconds to dissolve the amine hardener particles and form a heat-treated resin mixture. The heat treated resin mixture is cooled to a temperature of 120° C. to form a low-viscosity resin mixture having a viscosity of 150 mPas. The low-viscosity resin mixture is injected into a standard resin transfer mould that contains a preform made from 2 layers of 4×268 gsm HTS carbon fibre (+45°, 0°, −45°, 90°) non-crimp fabric (NCF) and 2 layers of 4×268 gsm HTS carbon fibre (−45°, 0°, +45°, 90°) (NCF), available from Saertex (Saebeck Germany). The preform dimensions are 800 mm×800 mm×4 mm.

The low-viscosity resin is maintained in the mould at a dwell-temperature of 120° C. for a dwell-time of at least 100 minutes during which time the mould is completely filled and preform is completely wetted-out. The pressure in the mold is kept at 3 bar. After 100 minutes, the temperature is raised to 190° C. for 2 hours to completely cure the part.

EXAMPLE 5

ST15 epoxy LCM resin, which contains amine hardener particles, is heated to a pot temperature of 80° C. to form an uncured resin mixture having a pot viscosity of 900 mPas. The uncured resin mixture is heated to 150° C. for 30 seconds to dissolve the amine hardener particles and form a heat-treated resin mixture. The heat treated resin mixture is cooled to a temperature of 100° C. to form a low-viscosity resin mixture having a viscosity of 350 mPas. The low-viscosity resin mixture is infused into a preform made from 2 layers 4×268 gsm HTS carbon fibre (+45°, 0°, −45°, 90°) non-crimp fabric (NCF) and 2 layers 4×268 gsm HTS carbon fibre (−45°, 0°, +45°, 90°) (NCF), available from Saertex (Saebeck Germany). The preform dimensions are 1000 mm×1000 mm×4 mm.

The low-viscosity resin is maintained in the infusion mould at a dwell-temperature of 100° C. for a dwell-time of at least 120 minutes until the infusion mould is completely filled and the preform is completely wetted-out. After 120 minutes, the temperature is raised to 190° C. for 2 hours to completely cure the part.

As can be seen from the above examples, the present invention provides a significant prolonging of the processing window for LCM resins that contain particulate hardeners. This increase in the processing window is achieved by the combination of heat-treating the LCM resin at a temperature above the particle dissolution temperature prior to introducing the resin into the mould and then maintaining the mould temperature below the dissolution temperature.

The heat-treatment step provides the advantage of dissolving the hardener particles ahead of time to insure that the particles are not filtered out by the fibrous support when the LCM resin is injected into the mould. It was discovered that this heat-treatment step could be accomplished without the viscosity of the LCM resin increasing to unacceptable levels either before or after injection into the resin transfer mould. Since the hardener particles are dissolved before the resin enters the mould, it is not necessary for the mould to be at the dissolution temperature, which is the conventional practice to insure complete dissolution of the particles in the mould. In accordance with the present invention, the heat-treatment step allows one to maintain the mould at temperatures below the dissolution temperature which results in the observed unexpected significant increases in the processing window of the LCM resins that contain particulate hardeners. As a result, composite parts that were previously too large or complex to be formed by LCM using epoxy resins that contain particulate hardeners, may now be made using this popular molding method.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited by the above-described embodiments, but is only limited by the following claims.

What is claimed is:

1. A liquid composite moulding process comprising the steps of:
providing an uncured resin mixture comprising a liquid thermosetting resin selected from the group consisting of liquid epoxy resin and liquid bismaleimide resin and a particulate hardener for said liquid thermosetting resin, said particulate hardener being dispersed within said liquid thermosetting resin, said particulate hardener having a dissolution temperature above which said particulate hardener dissolves in said thermosetting resin, said uncured resin mixture being at a pot temperature and having a pot viscosity;
heating said uncured resin mixture to a dissolution temperature for a sufficient time to dissolve said particulate hardener and form a liquid heat-treated resin mixture that has a viscosity which is below said pot viscosity;
cooling, said liquid heat-treated resin mixture to a temperature below said dissolution temperature to form a liquid resin mixture in which said particulate hardener is dissolved;
introducing said liquid resin mixture into a mould that contains a fibrous structure;
maintaining said liquid resin mixture within said mould at a dwell-temperature, which is below said dissolution temperature, for a sufficient dwell-time to infuse said fibrous structure with said liquid resin mixture; and
curing said liquid resin mixture at a cure temperature.

2. A liquid composite moulding process according to claim 1 wherein said thermosetting resin is an epoxy resin and said particulate hardener is an amine hardener.

3. A liquid composite moulding process according to claim 1 wherein the viscosity of said liquid resin mixture is between about 100 mPas and 600 mPas.

4. A liquid composite moulding process according to claim 3 wherein the viscosity of said liquid resin mixture is about 150 mPas.

5. A liquid composite moulding process according to claim 1 wherein said pot viscosity is between about 200 mPas and 1000 mPas.

6. A liquid composite moulding process according to claim 1 wherein said pot temperature is between about 65° C. and 95° C.

7. A liquid composite moulding process according to claim 1 wherein said dissolution temperature is between about 140° C. and 170° C.

8. A liquid composite moulding process according to claim 2 wherein said dwell-temperature is at least 10° C. below said dissolution temperature.

9. A liquid composite moulding process according to claim 1 wherein said dwell-temperature is between about 100° C. and 130° C.

10. A liquid composite moulding process according to claim 9 wherein said dwell-time is at least 80 minutes.

11. A liquid composite moulding process according to claim 10 wherein said dwell-time is at least 100 minutes.

12. A liquid composite moulding process according to claim 1 wherein said curing temperature is between about 170° C. and 210° C.

13. A process for prolonging the time it takes a liquid resin mixture to reach a viscosity of 1000 mPas in a mould wherein said resin mixture contains a thermosetting resin selected from the group consisting of epoxy and bismaleimide in which a particulate hardener for said thermosetting resin is dispersed, said method comprising the steps of:
heating said liquid resin mixture to a dissolution temperature for a sufficient time to dissolve said particulate hardener to form a liquid heat-treated resin mixture;
cooling said liquid heat-treated resin mixture to form a liquid resin mixture prior to introduction of said liquid resin mixture into said mould wherein said particulate hardener is dissolved in said liquid resin mixture; and
introducing said liquid resin mixture into said mould wherein the temperature within said mould is at a dwell temperature which is below said dissolution temperature.

14. A method according to claim 13 wherein said thermosetting resin is an epoxy resin and said particulate hardener is an amine hardener.

15. A method according to claim 13 wherein the viscosity of said liquid resin mixture prior to introduction into said mould is between about 100 mPas and 600 mPas.

16. A method according to claim 13 wherein said dissolution temperature is between about 140° C. and 170° C.

17. A method according to claim 13 wherein the dwell temperature of said mould is at least 10° C. below said dissolution temperature.

18. A method according to claim 17 wherein the dwell temperature of said mould is between about 100° C. and 130° C.

19. A method according to claim 17 wherein the time it takes said liquid resin mixture to reach a viscosity of 1000 mPas is at least 80 minutes.

20. A method according to claim 17 wherein the temperature within said mould is raised to the curing temperature of said thermosetting resin after said liquid resin mixture is introduced into said mould.

* * * * *